US006305159B1

(12) United States Patent
Nagel

(10) Patent No.: US 6,305,159 B1
(45) Date of Patent: Oct. 23, 2001

(54) INTERNAL COMBUSTION ENGINE AND METHOD FOR THE OPERATION OF AN INTERNAL COMBUSTION ENGINE

(76) Inventor: Edmund Ferdinand Nagel, Reichsstrasse 82, A-6800 Feldkirch (AT)

( * ) Notice: Subject to any disclaimer, the term of this patent is extended or adjusted under 35 U.S.C. 154(b) by 0 days.

(21) Appl. No.: 09/689,385

(22) Filed: Oct. 12, 2000

(30) Foreign Application Priority Data

Oct. 13, 1999 (AT) .................................................. 1730/99

(51) Int. Cl.[7] .................................................. F02C 5/00
(52) U.S. Cl. .......................................... 60/39.6; 417/364
(58) Field of Search ........................... 60/39.6, 620, 622; 417/364

(56) References Cited

U.S. PATENT DOCUMENTS

| | | | | |
|---|---|---|---|---|
| 3,808,818 | * | 5/1974 | Cataldo | 60/620 |
| 4,716,720 | * | 1/1988 | Eickmann | 60/39.6 |
| 5,314,314 | * | 5/1994 | Hinkle | 417/364 |

FOREIGN PATENT DOCUMENTS 1964 427 B   9/1971 (DE) .

OTHER PUBLICATIONS

*English Abstract of DE 1964 427 B.

* cited by examiner

Primary Examiner—Hoang Nguyen
(74) Attorney, Agent, or Firm—Reed Smith LLP

(57) ABSTRACT

In an internal combustion engine with one or more combustion chambers for burning fuel in timed explosions while forming a combustion gas under pressure, the combustion chambers are connected with at least one work chamber which is separate from the combustion chambers and which has a piston for converting energy of the combustion gas formed in an explosion cycle into mechanical energy or work. At least one injection nozzle which opens into the work chamber is provided for spraying in a cooling liquid to initiate an implosion cycle following the explosion cycle, and one or more precompression pumps which are driven by the movement of the piston during the implosion cycle are provided for compressing air to be introduced into the combustion chambers.

16 Claims, 3 Drawing Sheets

INTERNAL COMBUSTION ENGINE AND METHOD FOR THE OPERATION OF AN INTERNAL COMBUSTION ENGINE

BACKGROUND OF THE INVENTION

1. Field of the Invention

The invention is directed to an internal combustion engine with one or more combustion chambers for burning fuel in timed explosions while forming a combustion gas under pressure.

2. Description of the Related Art

Internal combustion engines are combustion engines characterized by a periodic or cyclic series of individual explosions in contrast to a continuous series such as that taking place in a gas turbine, for instance. In an internal combustion engine, generally, a fuel-air mixture is burned in a cylinder and a piston mounted in this cylinder is accordingly moved, and the energy of the combustion gas is converted into mechanical energy. Known internal combustion engines of this kind are, for example, the Otto engine and the diesel engine.

Further, internal combustion engines having an expansion chamber which is separate from the combustion chamber in which the fuel is burned cyclically while forming a combustion gas and which is connected to the combustion chamber via a controllable inlet valve and in which a piston is mounted so as to be displaceable so that the energy of the combustion gas is converted into mechanical energy or work are known, for example, from EP 0 957 250 A2, AT-PS 172 823, CH-PS 202 930, FR-PS 820 750, DE-PS 4 136 223 and U.S. Pat. No. 4,716,720. The advantage of these internal combustion engines in particular consists in that the combustion gas formed during combustion can fully expand during the expansion cycle in the expansion chamber so that the energy of the combustion gas can be better utilized. The filling of the combustion chamber with the fuel-air mixture can be carried out at atmospheric pressure or with compression. The use of an individual compressor pump for the compression of the air in the combustion chambers is already known, e.g., from DE-PS 4 136 223 and U.S. Pat. No. 4,716,720.

Further, DE-OS 32 14 516 discloses an internal combustion engine in which the fuel-air mixture is burned in a first cylinder so that a piston mounted in this cylinder is moved and performs some of the mechanical work. Another portion of the mechanical work is performed by a piston which is mounted in a second cylinder in which the residual pressure of the first cylinder can expand when the piston mounted in the first cylinder has reached its bottom dead center. In addition, a third cylinder with a piston mounted therein is provided for precompression of air in the first cylinder.

OBJECT AND SUMMARY OF THE INVENTION

It is the primary object of the invention to provide a novel internal combustion engine which is distinguished by a simple construction and improved efficiency.

In accordance with the invention, the above object is met by an internal combustion engine comprising one or more combustion chambers for burning fuel in timed explosions while forming a combustion gas under pressure. The combustion chambers are connected with at least one work chamber which is separate from the combustion chambers and which has a piston for converting energy of the combustion gas formed in an explosion cycle into mechanical energy or work. At lest one injection nozzle is provided which opens into the work chamber for spraying in a cooling liquid to initiate an implosion cycle following the explosion cycle. One or more precompression pumps are included which are driven by movement of the piston during an implosion cycle for compressing air to be introduced into the combustion chambers.

Accordingly, in the internal combustion engine according to the invention, an implosion cycle follows an explosion cycle in that a cooling liquid is sprayed into the work chamber. In this way, the temperature of the hot combustion gas is cooled suddenly, wherein the pressure in the work chamber is reduced to a pressure below atmospheric pressure. This negative pressure acting on the piston is utilized for scavenging the combustion chambers and for precompression of air in the combustion chambers in that one or more precompression pumps are provided which are driven by the movement of the piston during the implosion cycle.

In a preferred embodiment form of the invention, the combustion chamber walls are thermally insulated in such a way that their temperature lies above the autoignition temperature of the fuel. For this purpose, a thermal insulation can be provided surrounding the outside of the combustion chamber or the combustion chamber itself can be constructed from a material with poor heat conduction such as ceramics. An ignition or explosion cycle is then advantageously initiated in that the fuel is sprayed into the combustion chamber and onto the chamber walls. In order to further minimize heat radiation losses, the head of the work chamber (the cylinder head) and the piston are also advantageously thermally insulated. Further, a device for spraying water into the combustion chamber during the burning of fuel is preferably provided to reduce NOx emissions.

Further advantages and particulars of the invention are described in the following with reference to the accompanying drawings.

BRIEF DESCRIPTION OF THE DRAWINGS IN THE DRAWINGS

Figure 1:
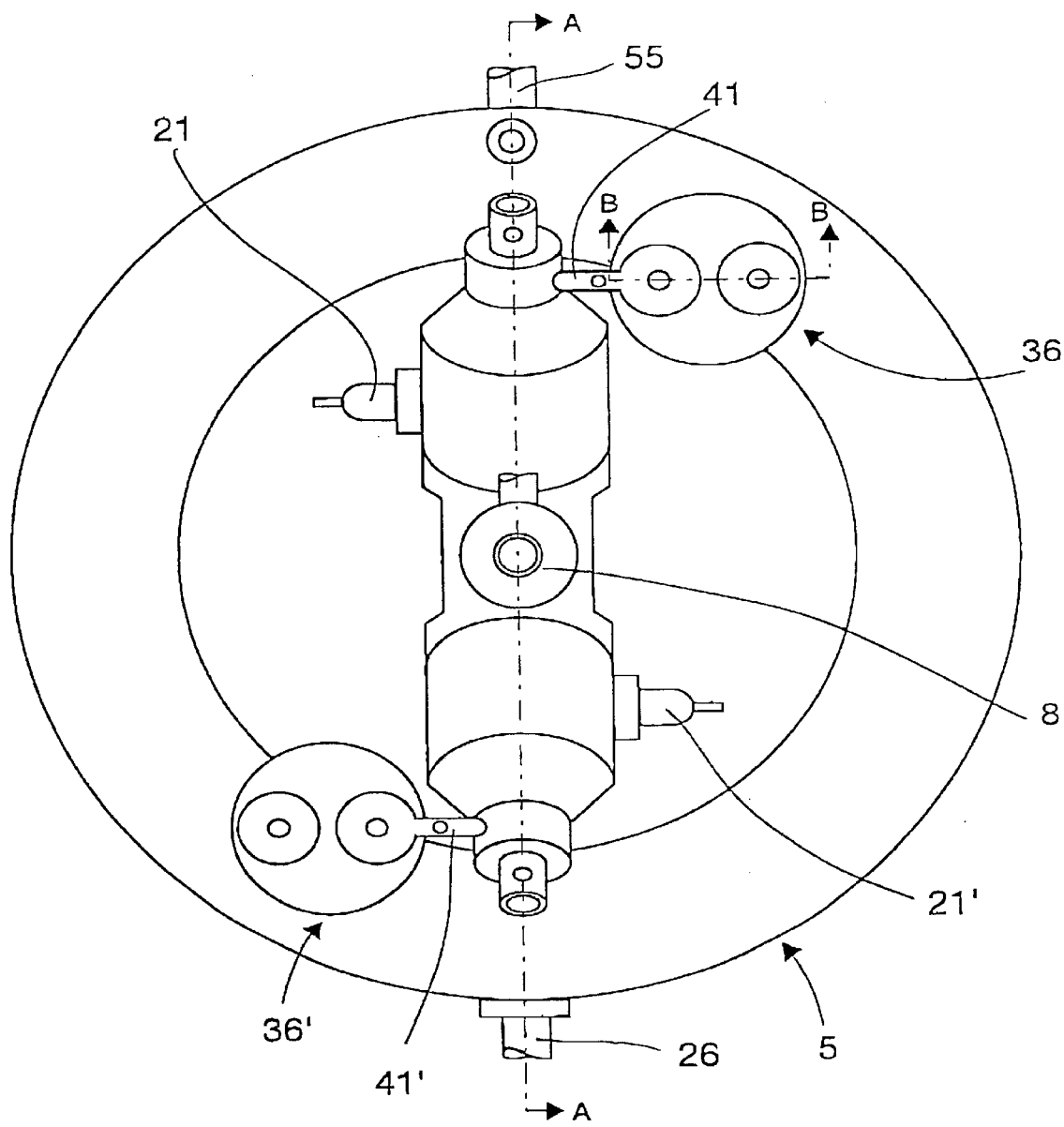
FIG. 1 shows a schematic top view of an internal combustion engine according to the invention.

The embodiment example of the internal combustion engine according to the invention that is shown in the drawings has combustion chambers 1, 1' which are arranged in a V-shaped manner and are connected, via a controllable combustion chamber outlet valve 2, to a work chamber 3 which is formed by the cylinder space of a piston-cylinder unit 5 having a piston 4. An internal combustion engine according to the invention can also have a plurality of work chambers 3 which are connected with one or more combustion chambers 1, 1'.

The outlet valve 2 comprises a valve disk 6 and a valve stem 7 which is preferably made of a ceramic material in order to minimize heat transfer. The free end of the valve stem 7 extends into a cylinder 8 and has, in the area of the free end, an area of greater diameter to which an annular sealing lip 9 is fixed. In the closed state of the outlet valve 2, this sealing lip 9 rests on an annular continuation 10 at the inner side of the wall of the cylinder 8. Therefore, in the closed state of the outlet valve 2, the hydraulically active diameter is the surface enclosed by the annular continuation 10, which leads to high closing force, whereas in the opened or partially open state of the outlet valve 2, the opening surface of the opening of the cylinder 8 receiving the valve stem 7 is a determining factor, so that a quick closing speed is achieved with a small amount of required hydraulic fluid. A helical spring 11 which is supported at a flange 12 at the valve stem 7 biases or pretensions the outlet valve in the open position. Further, this helical spring acts upon a stopper seal 13 for sealing the valve stem 7 relative to the combustion chambers 1, 1'.

Figure 2:
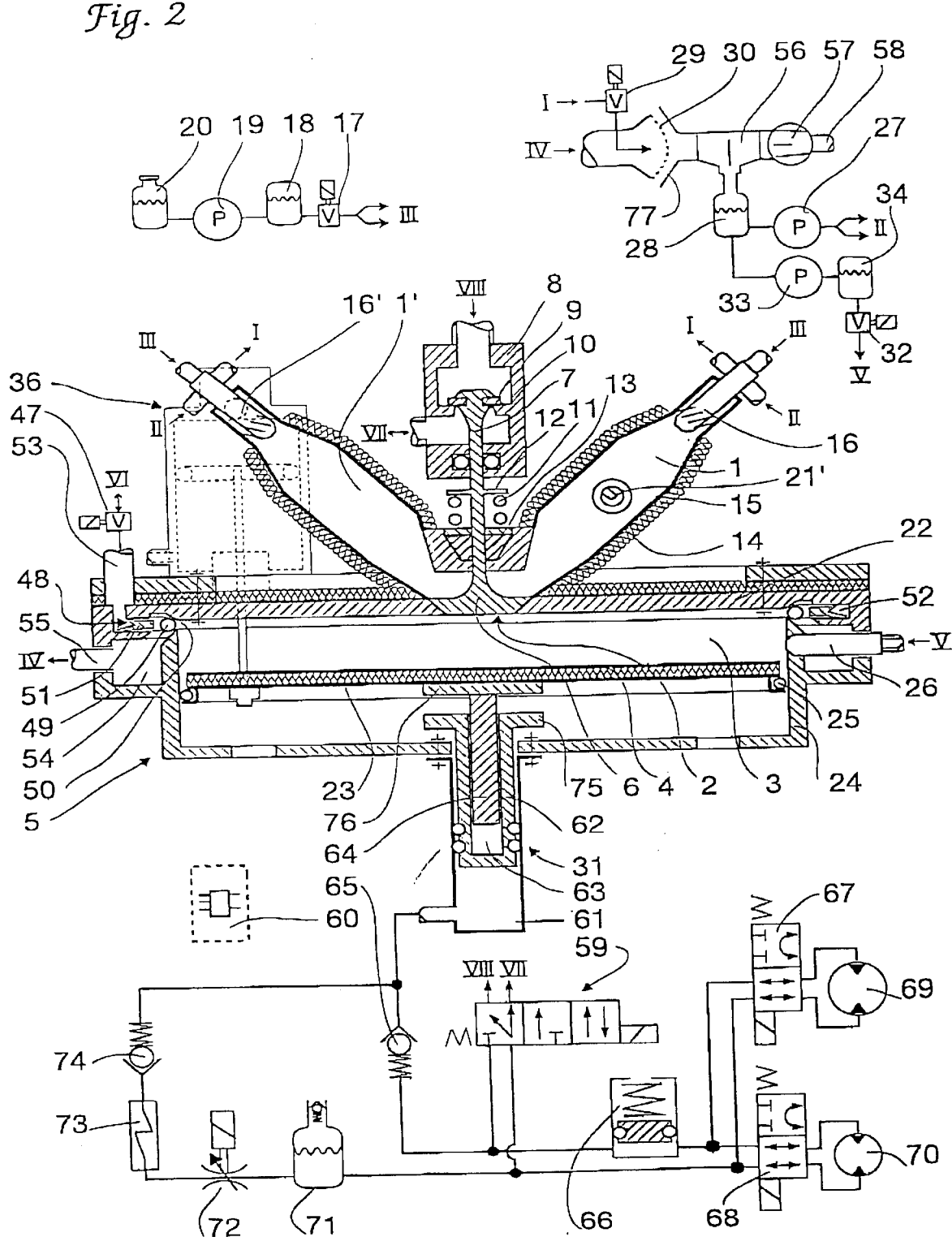
FIG. 2 shows a section along line A—A of FIG. 1 together with schematic views of the control and hydraulic circuit of the engine.
Figure 3:
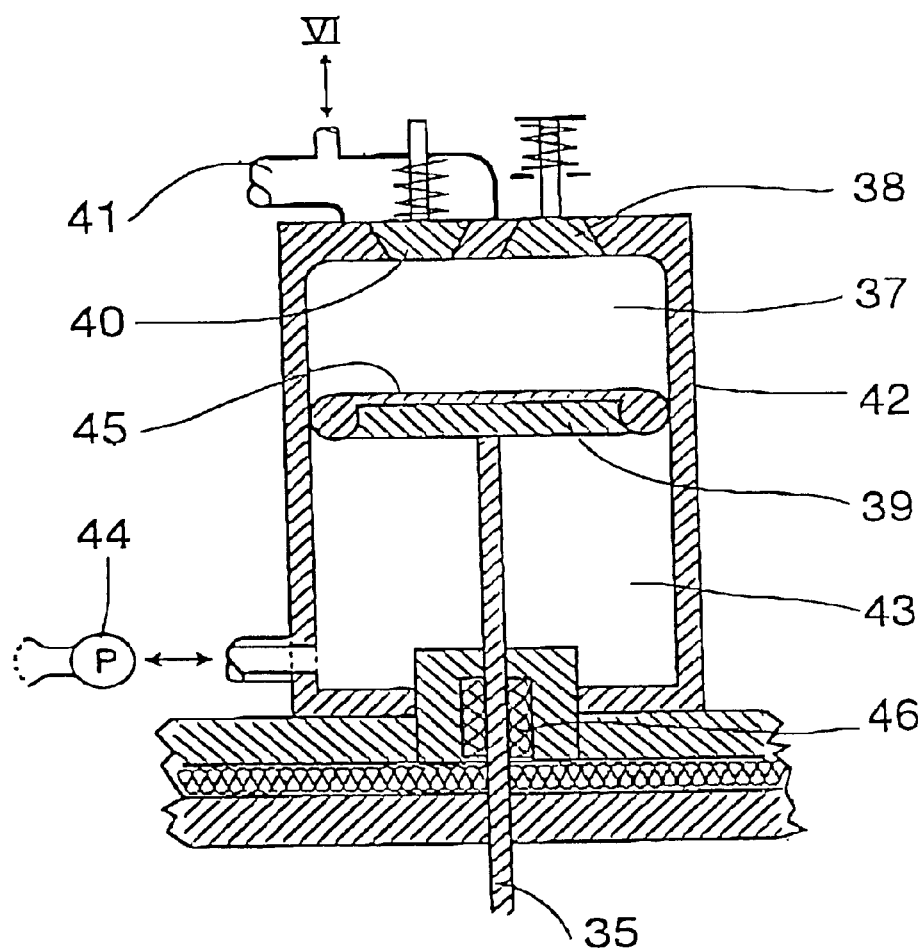
FIG. 3 shows a section along line B—B of FIG. 1.

The outlet valve is controlled via the burner outlet control valve 59 which communicates with the hydraulic circuit described later on, specifically with the inlet side of the hydraulic motors 69, 70 which has a relatively high pressure and with its return side which has a relatively low pressure. The control valve 59 has three positions. In the right-hand position shown in FIG. 2, both connections VII, VIII of the cylinder 8 are connected to low pressure and the outlet valve 2 is opened because of the pretensioning of the spring 11. In the middle position of the control valve 59, the outlet valve is closed (connection VIII with high pressure, connection VII closed) and in the left-hand position of the control valve 59 the high closing pressure of the outlet valve 2 is applied, wherein a high pressure is applied to connection VIII and connection VII is connected to low pressure.

The combustion chambers 1, 1' are surrounded by a thermal insulation 14 in order to prevent heat radiation of the walls 15 of the combustion chambers 1, 1' as far as possible. Therefore, during continuous operation of the internal combustion engine the walls 15 of the combustion chambers 1, 1' heat up to very high temperatures above 700° C., preferably in the range of up to or above 1200° C.

The fuel is injected directly into the combustion chambers 1, 1'. Provided for this purpose are double nozzles 16, 16' which are also used for spraying in water and whose function will be discussed more exactly in the following. The spray characteristic of the double nozzles 16, 16' is formed in a broadly fanned out manner for the fuel so that the walls 14 of the combustion chambers 1, 1' are wetted with fuel as well as possible and over the largest possible surface during the injection of fuel. An electromagnetic switching valve 17 is provided for controlling the fuel injection, and a pressure accumulator 18 for fuel in the form of an air vessel which is acted upon by a fuel pump 19 which, in turn, conveys fuel from a tank 20 is connected to this electromagnetic switching valve 17. The reference switching time for the electromagnetic switching valve 17 is in the range of one millisecond. Such electromagnetic switching valves are known in the automotive field (for example, K-Jettronic or Common Rail).

Spark plugs 21, 21' are provided for cold-starting the internal combustion engine. As soon as the walls 15 of the combustion chambers 1, 1' are sufficiently heated and autoignition of the injected fuel occurs (at temperatures over approximately 600° C.), the spark plugs 21, 21' are no longer fired. Because of its autoignition, the fuel is finely atomized by the injection nozzles and introduced into the combustion chamber only at the moment of ignition. When the individual fuel droplets impinge, they ignite at the burner walls with flame centers around each individual droplet.

Because of the flame center occurring around each individual droplet as a result of the multiple surface ignitions, there is a pronounced knock of the engine, i.e., the combustion proceeds with extreme turbulence and at high speed. In contrast to conventional internal combustion engines in which this effect is extremely undesirable (prevention through antiknock agent and limited compression ratios), this type of combustion is very advantageous in the engine according to the invention since, in particular, the turbulence of the combustion with supersonic gas eddies leads to an intensive mixing of the mixture during burnup. This already makes possible air factors of lambda 1.05 for approximately CO-free and HC-free burnup, wherein values far below the exhaust gas value of an Otto engine with catalytic converter can be achieved. Due to the fact that the gas transfer caused by pressure is faster than the flame speed during burnup, the combustion chamber outlet valve 2 remains closed until complete combustion of the mixture because otherwise unburned mixture reaches the work chamber 3 and no longer ignites therein.

In order to minimize thermal losses in the piston-cylinder unit 5 as far as possible, the insulation 14 also extends over the cylinder head 22. In addition, the piston is provided with insulation 23. Only the cylinder wall 24 is not thermally insulated, but rather is even advantageously provided with cooling ribs (not shown in the FIGS.) in order to prevent excessive thermal loading of the piston seal 25. This piston seal 25 is made of plastic, preferably graphite-Teflon, which is resistant to continuous temperatures up to approximately 250° C. This seal 25 is water-lubricated and one or more coolant water spray nozzles which are arranged along the circumference of the cylinder wall 24 (or on the cylinder head 22) and whose function will be described more exactly in the following cause an additional cooling and a lubrication of the piston seal 25.

In order to reduce NOx emission of the internal combustion engine, water is injected into the combustion chambers 1, 1' during the explosion cycle. This water injection is likewise carried out via double nozzles 16, 16'. For this purpose, each of the double nozzles 16, 16' has a central inner nozzle for spraying the fuel and an outer nozzle which surrounds this inner nozzle annularly for injection of water. The nozzle opening of the inner fuel nozzle and the nozzle opening of the water nozzle are closed in pressureless state and only open when these nozzles are acted upon by a high pressure such as is known in conventional diesel nozzles. At its circumferential wall, the outer water nozzle has a water inlet and a water outlet located opposite to the latter, wherein coolant water flows through this water nozzle also in the closed state of its nozzle opening, so that the inner fuel nozzle is also cooled and no fuel can condense when the walls 15 of the combustion chambers 1, 1' are hot but no explosion cycle is carried out and the engine is at rest. The flow of water through the outer water nozzle of the double nozzle 16, 16' is caused by the pump 27 which pumps water from a storage vessel 28. An electromagnetic valve 29 is provided in the return of the outer water nozzle of the double nozzle 16, 16'. As soon as this is closed, a pressure builds up in the outer water nozzle of the double nozzle 16, 16' and water is injected into the combustion chamber 1, 1'. When the valve 29 is open, the water flows back to the storage vessel 28 via the spray head 30 and the air intake head 31 whose function will be described in more detail in the following.

A work cycle of the internal combustion engine according to the invention will be described more fully in the following:

When a new work cycle is to follow directly upon a preceding work cycle and the engine is operated at its highest cycle number, the injection of fuel into the combustion chambers 1, 1' which are filled with fresh air is carried out at the moment when the piston 4 is on an upward movement after about two thirds of the way from the bottom dead center UT to the top dead center OT. The outlet valve 2 is closed at this point. In continuous operation, the ignition of the injected fuel is carried out immediately by autoignition at the walls 15 of the combustion chambers 1, 1', while the spark plugs 21, 21' are utilized for this purpose in the startup phase. As the piston 4 continues to move upward, the combustion progresses in the combustion chambers 1, 1' and is completely concluded when, or shortly after, the top dead center point OT of the piston 4 is reached. The outlet valve 2 is subsequently opened and the hot combustion gas which is under pressure flows into the work chamber 3 and drives the piston 4 downward. In so doing, the piston 4 performs work against the hydraulic pump device 31 described in the following. When the piston 4 reaches the bottom dead center UT, the combustion gas has expanded to approximately atmospheric pressure. For this purpose, the volume of the work chamber 3 is substantially greater, preferably more than five times greater than the volume of the combustion chambers 1,1'.

The explosion cycle is accordingly concluded and, subsequently, an implosion cycle is initiated in which the scavenging of the combustion chambers 1, 1' and the refilling and precompression of the latter are carried out. In addition, the coolant water spray nozzle 26 (a plurality of spray nozzles of this kind are preferably arranged at uniform distances about the circumference of the cylinder wall 24, although only one such spray nozzle is shown in the Figures for the sake of simplicity) is triggered by actuation of the electromagnetic valve 32. The coolant water spray nozzle 26 is fed from a pressure accumulator 34 in the form of an air vessel acted upon by a pump 33. The pump 33 draws its water from the storage vessel 28 which was already mentioned. The coolant water is sprayed in under high pressure, wherein the spray angle is as large as possible to ensure the most uniform possible spraying of the work chamber (for this purpose, as was already mentioned, a plurality of coolant water spray nozzles 26 are provided). However, the spray nozzle angle is selected in such a way that neither the work piston 4 nor the cylinder head 22 is sprayed; rather, the spray water precipitates on the opposite wall 44. Due to the fact that coolant water is sprayed in, the temperature of the hot explosion gas is reduced suddenly and a negative pressure is built up, wherein the pressure in the work chamber 3 is approximately 0.2 bar at the start of the implosion cycle. Because of this negative pressure, the piston 4 is pulled upward in the direction of the top dead center OT. The force exerted on it is transmitted via piston rods 35 to precompression pumps 36, 36' which are constructed in this case as piston-cylinder units. During the downward movement of the piston 4 during the explosion cycle, the first cylinder spaces 37 of the precompression pumps 36, 36' are charged with fresh air via the inlet valves 38, which are constructed as self-closing check valves, in that the piston 39 of the precompression pumps 36, 36' are pulled downward by the piston 4 of the work chamber 3. During the upward movement of the piston 4 and the piston 39 connected with the latter during the implosion cycle, the outlet valve 40 which is constructed as a self-closing check valve opens and air flows through the lines 41, 41' into the combustion chambers 1,1', so that the combustion gas is first purged from the latter and is replaced by fresh air. When the charge exchange, which is also assisted by the negative pressure in the work chamber, is concluded, the outlet valve 2 is closed and increased pressure is subsequently built up in the combustion chambers 1, 1'. This pressure preferably ranges between 2 bar and 20 bar and is particularly preferably between 2 bar and 6 bar.

The pistons 39 of the precompression pumps 36, 36' are constructed as double-acting pistons, so that they divide each of the cylinders 42 into a first cylinder space 37, whose function has already been described, and a second cylinder space 43. The second cylinder space 43 can be acted upon by more or less high pressure via a pump 44. Depending on the application of pressure to the cylinder space 43, the latter forms a pneumatic spring with a greater or lesser spring constant. This pneumatic spring is tensioned during the explosion cycle by the downward movement of the piston 4 and accordingly reinforces the upward movement of the pistons 39 of the precompression pumps 36, 36' during the implosion cycle. This enables a simple control of precompression, for it must be ensured that at the end of every implosion cycle the piston 4 has just reached its top dead center and the pistons 39 of the precompression pumps 36, 36' have reached their top end positions. In these end positions, no air may remain in the cylinder space 37 as far as possible since this air would otherwise likewise act as a pneumatic spring and would therefore immediately press the piston 4 down again in an undesirable manner. In order for the air to be completely pushed out of the cylinder space 37, the pistons 39 also have elastic supports 45 on their sides facing the first cylinder spaces 37. Further, stopper seals 46 are provided for sealing the piston rods 35.

On its path from the bottom dead center to the top dead center, the piston 4 of the work chamber 3 further compresses the combustion gas which is located in the work chamber 3 and which is initially under negative pressure immediately after the start of the implosion cycle. The electromagnetic locking valve 47, which is open during the explosion cycle so that the exhaust outlet valve is held in its closed position, can advantageously be opened immediately after the start of the implosion cycle as soon as a negative pressure has formed in the work chamber 3. This locking valve 47 is opened, at the latest, when the piston 4, on its way from the bottom dead center to the top dead center, has compressed the combustion gas insofar as there is atmospheric pressure in the work chamber. The exhaust outlet valve 48 has a first elastic sealing ring 49 which extends around an annular gap 50 between the cylinder wall 24 and cylinder head 22 and which is elastically pretensioned toward the latter. A second elastic sealing ring 51 which outwardly surrounds sealing ring 49 annularly is located in an annular cavity between continuations of the cylinder head 22 and cylinder wall 24 which extend outward. This annular cavity is connected, via a line 53 passing through the cylinder head 22, to the locking valve 47 which is connected in turn to the line 41 or 41' which opens into the combustion chamber 1 or 1' and is acted upon by air from the precompression pump 36 and 36'. The sealing ring 51 is raised from sealing ring 49 in its relaxed state and is located in the rear area of the cavity 52. The height of the cavity 52 is greater than the height of the annular gap 50. Therefore, when the locking valve 47 is open during the explosion cycle and there is a pressure of approximately equal magnitude in lines 41, 41' and in the work chamber 3 when the outlet valve 2 is open, the sealing ring 51 is upset and is pressed against the inner sealing ring 49 so that the annular gap 50 is closed. Therefore, no combustion gas can exit through the annular gap 50 into the buffer chamber or collecting chamber 54 for the exhaust gas. At the end of the explosion cycle before the start of the implosion cycle, the locking valve 47 is closed and the upset sealing ring 51 can expand and be displaced to the rear in the cavity 52 while lifting from the sealing ring 49. In this phase of the work cycle, the sealing ring 49 acts as a check valve that is pretensioned in the closing direction. As soon as the piston 4 has compressed the combustion gas in the work chamber to a pressure above atmospheric pressure on its path from the bottom dead center to the top dead center, the sealing ring 49 is lifted from the annular gap 50 by the pressure of the compressed combustion gas and the exhaust gas outlet valve 48 opens. The exhaust gas-steam mixture is pressed into the chamber 54 and is further pressed through the line 55 into the spray head 30 through which it is sprayed into the air intake head 77. In so doing, the exhaust gas-steam mixture is mixed with surrounding air by a factor of 1:50 to 1: 100 and is suddenly cooled to about 30° C. The cooled water precipitates in the precipitator 56. The fresh air is sucked in by means of a suction fan 57 arranged downstream. The exhaust gas-cooling air mixture is separated via an exhaust 58 while the precipitated coolant water is returned to the storage vessel 28.

When the piston 4 has reached the top dead center, a work cycle of the internal combustion engine is concluded and the combustion chambers 1, 1' are filled with precompressed fresh air. The next work cycle of the internal combustion engine can either be immediately initiated, depending on the instantaneous output requirement, in that fuel is injected into the combustion chambers 1, 1' or has already been introduced in the final phase of the upward movement of the piston by the injection of fuel or there is a pause of variable length before the next work cycle is initiated. The switching valve 17 for the fuel injection, valve 29 for spraying water into the combustion chambers 1, 1', valve 32 for spraying water into the work chamber 3, the locking valve 47 for controlling the exhaust gas outlet valve 48, and the burner outlet control valve 59 are controlled by a control unit 60 which has a microprocessor and which evaluates signals of corresponding sensors (not shown in the drawing).

The hydraulic pump device 31 and hydraulic drive acting upon the hydraulic circuit are described in the following:

The hydraulic pump device 31 has a trunk piston or plunger piston 62 which is mounted in a cylinder 61. This plunger piston has a cylindrical cavity 63 into which projects a piston rod 64 which is connected with piston 4 and serves as a guide. Provided at the underside of the piston 4 is a stop face 76 which encounters a shoulder 75 at the plunger piston 62 during the downward movement of the piston 4 and accordingly presses the plunger piston 62 down, wherein hydraulic fluid is pumped by the hydraulic pump device 31. This hydraulic fluid is supplied via a check valve 65 to a spring accumulator 66 which is acted upon by a steel spring and, further, via valves 67, 68, to the hydraulic motors 69, 70. The hydraulic motors 69, 70 are not adjustable (constant hydraulic motors), i.e., speed and torque are not adjustable at a given through-flow of hydraulic fluid and pressure of the hydraulic fluid. The use of swash-plate piston engines which have very high efficiency over a large speed and torque range is particularly preferred, wherein the hydraulic motors 69 and 70 are provided for different output and speed ranges. The spring accumulator 66 smoothes the pressure pulses formed in the individual pump cycles.

The hydraulic fluid flowing out of the hydraulic motors 69, 70 is returned to the cylinder 61 via the valves 67, 68, a pressure accumulator 71, an adjustable choke 72, cooling means 73 and another check valve 74. The pressure accumulator 71 applies a certain pressure to the return line in order to return the hydraulic fluid to the cylinder 61 during the upward movement of the piston 4. In so doing, the rate at which the hydraulic fluid flows back into the cylinder 61 is adjusted by the control unit 60 by means of the choke 72. The plunger piston 62 moves outward more or less quickly depending on the adjusted return flow speed of the hydraulic oil. This speed is limited in upward direction by the speed of the upward movement of the piston 4. If the speed of the upward movement of the plunger piston 62 is less than the speed of the upward movement of piston 4, the stop face 76 of piston 4 moves away by a greater or lesser distance from the annular shoulder 75 at the plunger piston 62. During a subsequent downward movement of the piston 4 due to an explosion cycle, the piston 4 initially moves down to a greater or lesser extent until its stop face 76 strikes the annular shoulder 75 at the plunger piston 62. The energy of the combustion gas is initially only converted to movement energy of the piston 4 along this distance of the downward movement of the piston and a pump output is not produced until the stop face 76 strikes the shoulder 75. If this distance is larger, the volume of the pumped hydraulic fluid is correspondingly smaller and the pressure is correspondingly higher. The torque delivered by the hydraulic motors 69, 70 or their output is controlled in this way.

Instead of the hydraulic pump device and hydraulic drive shown in the embodiment example described above, the piston 4 could also drive a shaft, for example, a crankshaft via a conventional connecting rod, in another embodiment example of the invention.

While the foregoing description and drawings represent the present invention, it will be obvious to those skilled in the art that various changes may be made therein without departing from the true spirit and scope of the present invention.

Reference numbers 1, 1' combustion chamber
2 outlet valve
3 work chamber
4 piston
5 piston-cylinder unit
6 valve disk
7 valve stem
8 cylinder
9 sealing lip
10 continuation
11 helical spring
12 flange
13 stopper seal
14 thermal insulation
15 wall
16, 16' double nozzle
17 switching valve
18 pressure accumulator
19 fuel pump
20 tank
21, 21' spark plug
22 cylinder head
23 insulation
24 cylinder wall
25 piston seal
26 coolant water spray nozzle
27 pump
28 storage vessel
29 valve
30 spray head
31 hydraulic pump device
32 valve
33 pump
34 pressure accumulator
35 piston rod
36, 36' precompression pumps
37 cylinder space
38 inlet valve
39 piston 40 outlet valve
41, 41' line
42 cylinder
43 cylinder space
44 pump
45 elastic support
46 stopper seal
47 locking valve
48 exhaust gas outlet valve
49 sealing ring
50 annular gap
51 sealing ring
52 cavity
53 line
54 collection chamber
55 line
56 precipitator
57 suction fan
58 exhaust
59 burner outlet control valve
60 control unit
61 cylinder
62 plunger piston
63 cavity
64 piston rod
65 check valve
66 spring accumulator
67 valve
68 valve
69 hydraulic motor
70 hydraulic motor
71 pressure accumulator
72 choke
73 cooling means
74 check valve
75 shoulder
76 stop face
77 air intake head

What is claimed is:

1. An internal combustion engine comprising:
   one or more combustion chambers for burning fuel in timed explosions while forming a combustion gas under pressure;
   said combustion chambers being connected with at least one work chamber which is separate from the combustion chambers and which has a piston for converting energy of the combustion gas formed in an explosion cycle into mechanical energy or work;
   at least one injection nozzle which opens into the work chamber being provided for spraying in a cooling liquid to initiate an implosion cycle following the explosion cycle; and
   one or more precompression pumps which are driven by movement of the piston during an implosion cycle being provided for compressing air to be introduced into the combustion chambers.

2. The internal combustion engine according to claim 1, wherein each of the precompression pumps has a piston which is mounted in a cylinder and whose piston rod acts at the piston of the work chamber or at a part connected with the latter.

3. The internal combustion engine according to claim 1, wherein the piston of the precompression pumps are constructed as double-acting pistons which divide the cylinders of the precompression pumps into a first and second cylinder spaces, wherein the first cylinder space communicates with the combustion chambers or one of the combustion chambers, and a compressed-air line leads into the second cylinder space acting as pneumatic spring for building up a more or less high air pressure in the second cylinder space.

4. The internal combustion engine according to claim 3, wherein each piston of the precompression pumps has an elastic support on the side of the first cylinder space for completely pressing out the air in the first cylinder space.

5. The internal combustion engine according to claim 1, wherein a controllable outlet valve is provided between the combustion chambers and the work chamber and has a valve stem which extends into a cylinder, an annular sealing lip is arranged at the valve stem and in the closed state of the outlet valve the valve stem acts at an annular continuation at the inner side of the wall of the cylinder, wherein the cylinder is divided into two cylinder spaces, each having a hydraulic connection.

6. The internal combustion engine according to claim 1, wherein the volume of the work chamber is substantially larger, more than five times greater than the volume of the combustion chambers opening into this work chamber.

7. The internal combustion engine according to claim 1, wherein a spray device is provided for spraying water into the combustion chambers in the explosion cycle.

8. The internal combustion engine according to claim 1, wherein the combustion chambers have a constant volume.

9. The internal combustion engine according to claim 1, wherein the piston of the work chamber drives a hydraulic pump device.

10. A method for operating an internal combustion engine in which a fuel is burned in timed explosions in one or more combustion chambers, comprising the steps of:
    allowing the combustion gas formed in the explosion cycle to flow out of the combustion chambers into a work chamber which is separate from the combustion chambers and which has a changeable volume and in which the combustion gas performs mechanical work by displacing a piston; and
    subsequently, in order to initiate an implosion cycle, reducing the pressure of the combustion gas to a pressure below atmospheric pressure by spraying a cooling liquid into the work chamber;
    wherein one or more precompression pumps are driven by this displacement of the piston of the work chamber which is caused or supported by this negative pressure in order to compress air to be introduced into the combustion chambers.

11. The method according to claim 10, wherein the pressure of the combustion gas in the work chamber is approximately at atmospheric pressure before the cooling liquid is sprayed in.

12. The method according to claim 10, wherein the fuel is burned with a constant volume of the combustion chambers.

13. The method according to claim 12, wherein the pressure of the combustion gas in the combustion chambers is in the range between 2 bar and 6 bar, prior to the injection of fuel.

14. The method according to claim 13, wherein the pressure of the combustion gas is in the range between 2.5 bar and 4 bar.

15. The method according to claim 13, wherein an outlet valve connecting the combustion chambers with the work chamber is closed during the explosion cycle.

16. The method according to claim 10, wherein water is sprayed into the combustion chambers during the explosion cycle in order to lower the NOx emission.

* * * * *